(12) United States Patent
Yanai et al.

(10) Patent No.: US 7,435,460 B2
(45) Date of Patent: Oct. 14, 2008

(54) LIQUID CRYSTAL COMPOSITION AND LIQUID CRYSTAL DISPLAY DEVICE

(75) Inventors: Motoki Yanai, Chiba (JP); Shuichi Goto, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 24 days.

(21) Appl. No.: 11/723,146

(22) Filed: Mar. 16, 2007

(65) Prior Publication Data
US 2007/0221882 A1    Sep. 27, 2007

(30) Foreign Application Priority Data
Mar. 23, 2006    (JP) ............... 2006-080042

(51) Int. Cl.
 *C09K 19/30* (2006.01)
 *C09K 19/12* (2006.01)
(52) U.S. Cl. ............... 428/1.1; 252/299.63; 252/299.66
(58) Field of Classification Search .................. 428/1.1; 252/299.63, 299.66
See application file for complete search history.

(56) References Cited
FOREIGN PATENT DOCUMENTS
JP    61-27931    2/1986
JP    10-114693    5/1998

OTHER PUBLICATIONS

English translation by computer for JP 10-114693, http://www4.ipdl.inpit.go.jp/Tokujitu/PAJdetail.ipdl?N0000=60&N0120=01&N2001=2&N3001=H10-114693.*

\* cited by examiner

*Primary Examiner*—Shean C Wu
(74) *Attorney, Agent, or Firm*—Hogan & Hartson LLP

(57) ABSTRACT

A liquid crystal composition having a nematic phase and including a compound represented by Formula (1), a compound represented by Formulas (2-1) and (2-2), and a compound represented by Formulas (3-1), (3-2) and (3-3), and a liquid crystal display device including the composition:

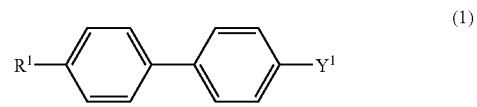

(1)

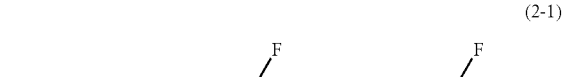

(2-1)

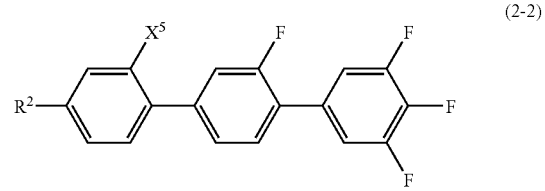

(2-2)

(3-1)

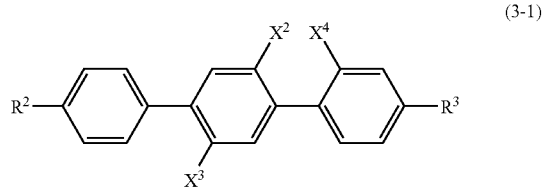

(3-2)

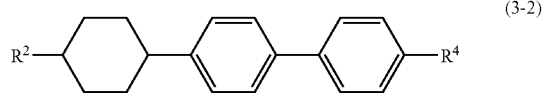

(3-3)

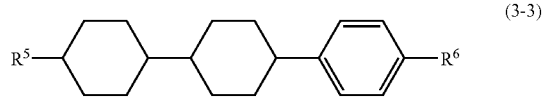

wherein, for example, $R^1$ is alkenyl having approximately 2 to approximately 12 carbons; $R^2$, $R^3$, $R^4$, $R^5$ and $R^6$ are alkyl having approximately 1 to approximately 12 carbons; $Y^1$ and $Y^2$ are fluorine; $X^1$ and $X^5$ are hydrogen; and $X^2$, $X^3$ and $X^4$ are hydrogen or fluorine, provided that at least one of $X^2$, $X^3$ and $X^4$ is fluorine.

14 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. § 119 to Japanese Patent Application No. JP 2006-080042, filed Mar. 23, 2006, which is expressly incorporated herein by reference in its entirety.

BACKGROUND OF THE INVENTION

1. Field of the Invention

The invention relates to a liquid crystal composition suitable for use mainly in an active matrix (AM) device, an AM device containing the composition and so forth. The composition has a nematic phase and a positive dielectric anisotropy.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes the relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal and AM Device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is large | Threshold voltage is low, electric power consumption is small, and contrast ratio is large |
| 5 | Specific resistance is large | Voltage holding ratio is large and a contrast ratio is large |
| 6 | It is stable to ultraviolet light and heat | Service life is long |

[1]A liquid crystal composition can be injected into a cell in a short time.

Table 1. General Characteristics of a Liquid Crystal Composition and AM Device

The optical anisotropy of the composition relates to the contrast ratio of the device. A product ($\Delta n \cdot d$) of the optical anisotropy ($\Delta n$) of the composition and the cell gap (d) of the device is designed to maximize the contrast ratio. A suitable value of the product depends on the kind of operation mode. In a device having a TN mode and so forth, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio of the device. In general, a larger dielectric anisotropy provides a large viscosity. A suitable dielectric anisotropy is demanded depending on purpose of a device. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to a service life of the liquid crystal display device. In the case where the stability is high, the device has a long service life.

Conventional compositions are disclosed in the following patent documents: JP S61-27931 A/1986 and JP H10-114693 A/1998.

A desirable AM device is characterized as having a wide usable temperature, a short response time, a large contrast ratio, a low threshold voltage, a large voltage holding ratio, a long service life and so forth. Even a one millisecond shorter response time is desirable. Thus, the composition having characteristics such as a high maximum temperature of a nematic phase, a low minimum temperature of a nematic phase, a small viscosity, a large optical anisotropy, a large dielectric anisotropy, a large specific resistance, a high stability to an ultraviolet light, a high stability to heat, and so forth is especially desirable.

SUMMARY OF THE INVENTION

The invention relates to a liquid crystal composition having a nematic phase that includes three components, wherein the first component is at least one compound selected from the group of compounds represented by Formula (1), the second component is at least one compound selected from the group of compounds represented by Formulas (2-1) and (2-2), and the third component is at least one compound selected from the group of compounds represented by Formulas (3-1), (3-2) and (3-3):

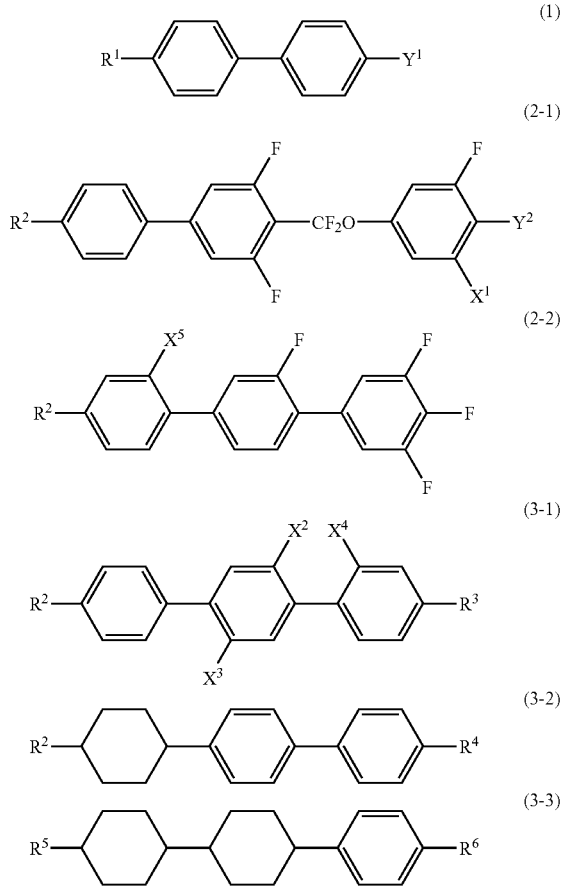

wherein $R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine; $R^2$, $R^3$ and $R^5$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine; $R^4$ is fluorine, alkyl having approximately 1 to approximately 12 carbons, or alkenyl having approximately 2 to approximately 12 carbons; $R^6$ is fluorine, chlorine, alkyl having approximately 1 to approximately 12 carbons, alkoxy having approximately 1 to approximately 12 carbons, or alkenyl having approximately 2 to approximately 12 carbons; $Y^1$ is fluorine or chlorine; $Y^2$ is fluorine or trifluoromethoxy; $X^1$ and $X^5$ are each independently hydrogen or fluorine; and $X^2$, $X^3$ and $X^4$ are each independently hydrogen or fluorine, provided that at least one of $X^2$, $X^3$ and $X^4$ is fluorine.

The invention also relates to a liquid crystal display device that includes the liquid crystal composition, and so forth.

DETAILED DESCRIPTION OF THE INVENTION

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a linear molecular structure. An optically active compound may occasionally be added to the composition. Even in the case where the compound is a liquid crystal compound, the compound is classified into an additive. "At least one compound selected from a group of compounds represented by Formula (1)" may be abbreviated to "the compound (1)." The group of compounds represented by formula (1) may also be abbreviated to "the compound (1)." The other formulas are applied with the same rules.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics such as optical anisotropy, the characteristics of the composition such as the optical anisotropy and so forth are values measured in the methods disclosed in the Examples. "A ratio of the first component" means the percentage by weight (% by weight) based on the total weight of a liquid crystal composition. A ratio of the second component and so forth are applied with the same rule. A ratio of an additive mixed with the composition means the percentage by weight (% by weight) based on the total weight of a liquid crystal composition.

One of the advantages of the invention is to provide a liquid crystal composition that satisfies many characteristics among the characteristics such as a high maximum temperature of a nematic phase, a low minimum temperature of a nematic phase, a small viscosity, a suitable and large optical anisotropy, a suitable dielectric anisotropy, a large specific resistance, a high stability to ultraviolet light and a high stability to heat. Another of the advantages of the invention is to provide a liquid crystal composition that is properly balanced regarding many characteristics. Still another of advantages of the invention is to provide a liquid crystal display device that contains the liquid crystal composition. A further one of advantages of the invention is to provide a liquid crystal composition that has a small viscosity, an optical anisotropy of from approximately 0.10 to approximately 0.17 and so forth, and is to provide an AM device that has a short response time, a large voltage holding ratio, a large contrast ratio, a long service life and so forth.

The compound (1) has a large optical anisotropy, a large dielectric anisotropy and a small viscosity. Under the circumstances, the compounds (2-1) and (2-2) and the compounds (3-1) to (3-3) are properly selected to satisfy high reliability and balance of various characteristics, whereby the composition is completed. The compounds (2-1) and (2-2) have a considerably high large dielectric anisotropy, and the compounds (3-1) to (3-3) have a suitable optical anisotropy, a high maximum temperature, a low minimum temperature and a small viscosity. A composition is prepared based on the concept to develop the composition having various characteristics, such as a suitable optical anisotropy, a suitable dielectric anisotropy, a small viscosity, a high reliability, a high maximum temperature and a low minimum temperature. Furthermore, component compounds that are capable of finely controlling the characteristics of the composition are studied to complete the invention.

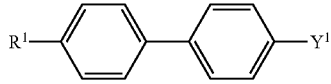

(1)

wherein $R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine; $Y^1$ is fluorine or chlorine.

The liquid crystal composition of the invention satisfies many characteristics among the characteristics such as a high maximum temperature of a nematic phase, a low minimum temperature of a nematic phase, a small viscosity, a suitable and large optical anisotropy, a suitable dielectric anisotropy, a large specific resistance, a high stability to ultraviolet light and a high stability to heat. The composition is properly balanced regarding many characteristics. The device of the invention contains the composition. The composition has a small viscosity, an optical anisotropy of from 0.10 to 0.17 and so forth, and is suitable for an AM device that has a short response time, a large voltage holding ratio, a large contrast ratio, a long service life and so forth.

The invention includes:

1. A liquid crystal composition having a nematic phase including three components, wherein the first component is at least one compound selected from the group of compounds represented by Formula (1); the second component is at least one compound selected from the group of compounds represented by Formulas (2-1) and (2-2); and the third component is at least one compound selected from the group of compounds represented by Formulas (3-1), (3-2) and (3-3):

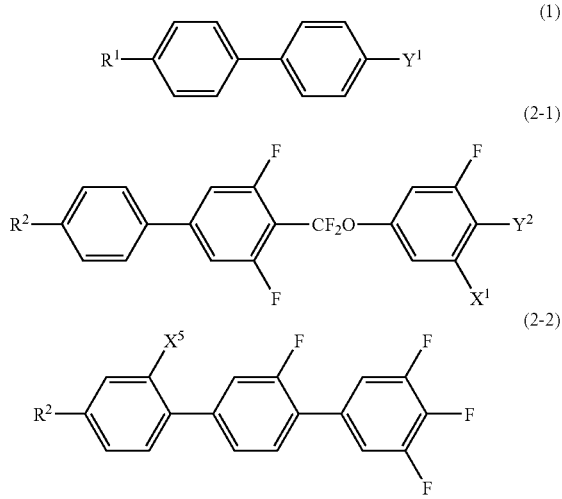

-continued

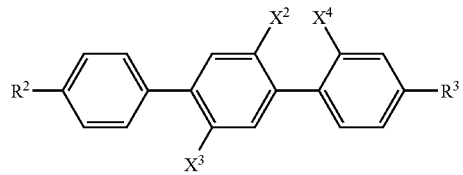

(3-1)

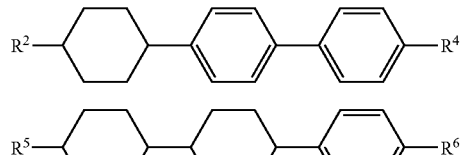

(3-2)

(3-3)

wherein $R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine; $R^2$, $R^3$ and $R^5$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine; $R^4$ is fluorine, alkyl having approximately 1 to approximately 12 carbons, or alkenyl having approximately 2 to approximately 12 carbons; $R^6$ is fluorine, chlorine, alkyl having approximately 1 to approximately 12 carbons, alkoxy having approximately 1 to approximately 12 carbons, or alkenyl having approximately 2 to approximately 12 carbons; $Y^1$ is fluorine or chlorine; $Y^2$ is fluorine or trifluoromethoxy; $X^1$ and $X^5$ are each independently hydrogen or fluorine; and $X^2$, $X^3$ and $X^4$ are each independently hydrogen or fluorine, provided that at least one of $X^2$, $X^3$ and $X^4$ is fluorine.

2. The liquid crystal composition according to item 1, wherein the second component is at least one compound selected from the group of compounds represented by Formula (2-1), and the third component is at least one compound selected from the group of compounds represented by Formula (3-1).

3. The liquid crystal composition according to item 1 or 2, wherein the ratio of the first component is in a range of from approximately 5% to approximately 20% by weight, the ratio of the second component is in a range of from approximately 10% to approximately 35% by weight, and the ratio of the third component is in a range of from approximately 10% to approximately 55% by weight, based on the total weight of the liquid crystal composition.

4. A liquid crystal composition having a nematic phase and including four components, wherein the first component is at least one compound selected from the group of compounds represented by Formula (1), the second component is at least one compound selected from the group of compounds represented by Formulas (2-1) and (2-2), the third component is at least one compound selected from the group of compounds represented by Formulas (3-1), (3-2) and (3-3), and the fourth component is at least one compound selected from the group of compounds represented by Formula (4):

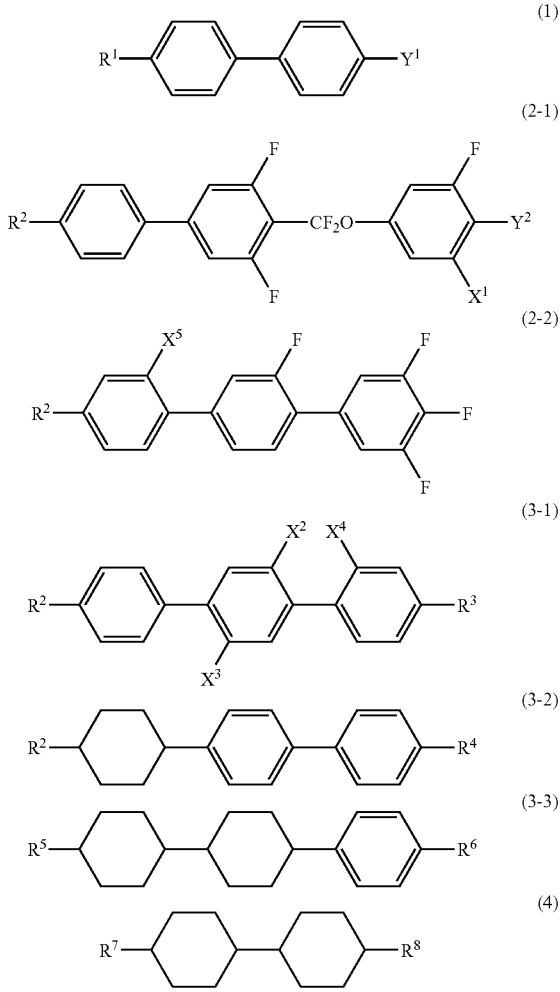

wherein $R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine; $R^2$, $R^3$ and $R^5$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine; $R^4$ is fluorine, alkyl having approximately 1 to approximately 12 carbons, or alkenyl having approximately 2 to approximately 12 carbons; $R^6$ is fluorine, chlorine, alkyl having approximately 1 to approximately 12 carbons, alkoxy having approximately 1 to approximately 12 carbons, or alkenyl having approximately 2 to approximately 12 carbons; $R^7$ and $R^8$ are each independently alkyl having approximately 1 to approximately 12 carbons, alkenyl having approximately 2 to approximately 12 carbons, or alkenyl having approximately 1 to approximately 12 carbons, arbitrary hydrogen of which is replaced by fluorine; $Y^1$ is fluorine or chlorine; $Y^2$ is fluorine or trifluoromethoxy; $X^1$ and $X^5$ are each independently hydrogen or fluorine; and $X^2$, $X^3$ and $X^4$ are each independently hydrogen or fluorine, provided that at least one of $X^2$, $X^3$ and $X^4$ is fluorine.

5. The liquid crystal composition according to item 4, wherein the second component is at least one compound selected from the group of compounds represented by formula (2-1).

6. The liquid crystal composition according to item 4 or 5, wherein the fourth component is at least one compound selected from the group of compounds represented by Formula (4), wherein $R^7$ is alkenyl having approximately 2 to approximately 12 carbons, and $R^8$ is alkyl having approximately 1 to approximately 12 carbons.

7. The liquid crystal composition according to item 5 or 6, wherein the third component is at least one compound selected from the group of compounds represented by Formula (3-1), wherein $X^2$ is fluorine, and $X^3$ and $X^4$ are hydrogen.

8. The liquid crystal composition according to any one of items 1 to 7, wherein in Formula (1), $Y^1$ is fluorine.

9. The liquid crystal composition according to any one of items 4 to 8, wherein the ratio of the first component is in a range of from approximately 5% to approximately 20% by weight, the ratio of the second component is in a range of from approximately 10% to approximately 35% by weight, the ratio of the third component is in a range of from approximately 10% to approximately 55% by weight, and the ratio of the fourth component is in a range of from approximately 10% to approximately 40% by weight, based on the total weight of the liquid crystal composition.

10. The liquid crystal composition according to any one of items 1 to 9, wherein the composition has a maximum temperature of a nematic phase of approximately 70° C. or more, an optical anisotropy in a range of from approximately 0.11 to approximately 0.17 at 25° C. and a wavelength of 589 nm, and a rotation viscosity in a range of from approximately 30 mPa·s to approximately 100 mPa·s at 25° C.

11. A liquid crystal display device including the liquid crystal composition according to any one of items 1 to 10.

The invention further includes the following: (1) the composition described above, wherein the composition further includes an optically active compound; (2) the composition described above, wherein the composition further includes at least one additive, such as an antioxidant, an ultraviolet light absorbent and an antifoaming agent; (3) an AM device including the composition described above; (4) a device having a TN, ECB, OCB or IPS mode, including the composition described above; (5) a device of a transmission type, including the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, the preparation methods of the component compound will be explained. Seventh, additives that may be added to the composition will be explained. Lastly, use of the composition will be explained.

First, the constitution of component compounds in the composition will be explained. The composition of the invention is classified into the composition A and the composition B. The composition A may further contain a liquid crystal compound, an additive, an impurity, and so forth. This liquid crystal compound is different from the compound (1), the compounds (2-1) and (2-2), the compounds (3-1), (3-2) and (3-3) and the compound (4). Such a compound is mixed with the composition for the purpose of adjusting the characteristics of the composition. The additive includes an optically active compound, a coloring matter, an antioxidant, an ultraviolet light absorbent and so forth. The impurity is a compound and so forth contaminated in the process such as the synthesis of a component compound and so forth.

The composition B essentially consists of the compounds selected from the compound (1), the compounds (2-1) and (2-2), the compounds (3-1), (3-2) and (3-3), and the compound (4). The term "essentially" means that the composition does not contain a liquid crystal compound which is different from these compounds, but may further contain other compounds (e.g., an additive, an impurity, and so forth). The components of the composition B are fewer than those of the composition A. The composition B is preferable to the composition A from the viewpoint of costs. The composition A is preferable to the composition B, because characteristics of the composition A can be further adjusted by mixing with other liquid crystal compounds.

Second, the main characteristics of the component compounds and the main effects of the compounds on the composition will be explained. The main characteristics of the component compounds are summarized in Table 2 according to the advantages of the invention. In Table 2, the symbol L represents large or high, the symbol M represents a middle degree, and the symbol S represents small or low.

A desirable ratio of the second component is approximately 10% or more for increasing the dielectric anisotropy, and is approximately 35% or less for decreasing the minimum temperature. A more desirable ratio is from approximately 15% to approximately 35%. A further desirable ratio is from approximately 15% to approximately 30%.

A desirable ratio of the third component is approximately 10% or more for increasing the maximum temperature, decreasing the minimum temperature and decreasing the viscosity, and is approximately 60% or less for decreasing the minimum temperature and increasing the dielectric anisotropy. A more desirable ratio is from approximately 10% to approximately 55%. A further desirable ratio is from approximately 15% to approximately 55%.

The fourth component is an optional component and is suitable for preparing a composition having a particularly small viscosity. A desirable ratio of the fourth component is approximately 45% or less for decreasing the minimum temperature. A more desirable ratio is approximately 40% or less. A further desirable ratio is approximately 35% or less.

In the composition A described above, a desirable total ratio of the first component, the second component, the third component and the fourth component is approximately 70% or more for obtaining good characteristics. A more desirable total ratio is approximately 90% or more. In the composition B described above, a total ratio of the four components is 100%.

Fourth, a desirable embodiment of the component compound will be explained.

TABLE 2

| | Characteristics of Compounds | | | | | | |
|---|---|---|---|---|---|---|---|
| | Compound (1) | Compound (2-1) | Compound (2-2) | Compound (3-1) | Compound (3-2) | Compound (3-3) | Compound (4) |
| Maximum Temperature | S | S | S | L | L | L | M |
| Viscosity | S | L | L | M | M | M | S |
| Optical Anisotropy | M | M | M | L | M | M | S |
| Dielectric Anisotropy | M | L | L | S | S | S | S |
| Specific Resistance | L | L | L | L | L | L | L |

The main effects of the component compounds to the characteristics of the composition upon mixing the component compounds to the composition are as follows. The compound (1) increases the dielectric anisotropy, increases the optical anisotropy, decreases the minimum temperature and decreases the viscosity. The compounds (2-1) and (2-2) largely increase the dielectric anisotropy. The compounds (3-1) to (3-3) increase the maximum temperature, decrease the minimum temperature, decrease the viscosity and control the optical anisotropy to a suitable value. The compound (4) largely decreases the viscosity of the composition.

Third, desirable ratios of the component compounds and the basis therefor will be explained. A desirable ratio of the first component is approximately 5% or more for increasing the dielectric anisotropy, increasing the optical anisotropy, decreasing the minimum temperature and decreasing the viscosity, and is approximately 30% or less for increasing the maximum temperature and decreasing the minimum temperature. A more desirable ratio is from approximately 5% to approximately 25%. A further desirable ratio is from approximately 6% to approximately 20%.

$R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine. Desirable $R^1$ is alkenyl having approximately 2 to approximately 8 carbons, alkadienyl having approximately 4 to approximately 8 carbons, or alkenyl having approximately 2 to approximately 8 carbons, arbitrary hydrogen of which is replaced by fluorine, for decreasing the minimum temperature and decreasing the viscosity. More desirable $R^1$ is alkenyl having approximately 2 to approximately 5 carbons. $R^2$, $R^3$ and $R^5$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine. Desirable $R^2$, $R^3$ and $R^5$ are alkyl having approximately 1 to approximately 8 carbons or alkenyl having approximately 2 to approximately 8 carbons for decreasing the minimum temperature and decreasing the viscosity. More desirable $R^2$, $R^3$ and $R^5$ are alkyl having approximately 1 to approximately 5 carbons or alkenyl having approximately 2 to approximately 5 carbons. $R^4$ is fluorine, alkyl having approximately 1 to approximately 12 carbons, or alkenyl having approximately 2 to approximately 12 carbons. Desirable $R^4$ is fluorine, alkyl having approximately 1 to approximately 8 carbons, or alkenyl having approximately 2 to approximately 8 carbons for decreasing the minimum temperature and decreasing the viscosity. More desirable $R^4$ is fluorine, alkyl having approximately 1 to approximately 5 carbons, or alkenyl having approximately 2 to approximately 5 carbons. Particularly $R^4$ is fluorine. $R^6$ is fluorine, chlorine, alkyl having approximately 1 to approximately 12 carbons, alkoxy having approximately 1 to approximately 12 carbons, or alkenyl having approximately 2 to approximately 12 carbons. Desirable $R^6$ is fluorine, chlorine, alkyl having approximately 1 to approximately 8 carbons, or alkenyl having approximately 2 to approximately 8 carbons for decreasing the minimum temperature and decreasing the viscosity. More desirable $R^6$ is fluorine, chlorine, alkyl having approximately 1 to approximately 5 carbons, or alkenyl having approximately 2 to approximately 5 carbons. $R^7$ and $R^8$ are alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine. Desirable $R^7$ and $R^8$ are alkyl having approximately 1 to approximately 8 carbons, alkenyl having approximately 2 to approximately 8 carbons, or alkenyl having approximately 2 to approximately 8 carbons, arbitrary hydrogen of which is replaced by fluorine, for decreasing the minimum temperature and decreasing the viscosity. More desirable $R^7$ and $R^8$ are such combinations that $R^7$ is alkenyl having approximately 2 to approximately 8 carbons or alkenyl having approximately 2 to approximately 8 carbons, arbitrary hydrogen of which is replaced by fluorine, and $R^8$ is alkyl having approximately 1 to approximately 8 carbons, alkenyl having approximately 2 to approximately 8 carbons, or alkenyl having approximately 2 to approximately 8 carbons, arbitrary hydrogen of which is replaced by fluorine. Particularly desirable $R^7$ and $R^8$ are such combinations that $R^7$ is alkenyl having approximately 2 to approximately 8 carbons, and $R^8$ is alkyl having approximately 1 to approximately 8 carbons, alkenyl having approximately 2 to approximately 8 carbons, or alkenyl having approximately 2 to approximately 8 carbons, arbitrary hydrogen of which is replaced by fluorine.

Desirable alkyl is methyl, ethyl, propyl, butyl, pentyl, hexyl, heptyl, or octyl. More desirable alkyl is ethyl, propyl, butyl, pentyl, or heptyl for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing a viscosity. A desirable steric configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing a viscosity. Cis is desirable in the alkenyl such as 2-butenyl, 2-pentenyl and 2-hexenyl. In these alkenyls, linear alkenyl is preferable to branched alkenyl.

Desirable examples of alkenyl, arbitrary hydrogen of which is replaced by fluorine, is 2,2-difluorovinyl, 3,3-difluoro-2-propenyl, 4,4-difluoro-3-butenyl, 5,5-difluoro-4-pentenyl and 6,6-difluoro-5-hexenyl. More desirable examples thereof include 2,2-difluorovinyl for decreasing the viscosity.

A desirable steric configuration of 1,4-cyclohexylene in the compounds is cis rather than trans for increasing the maximum temperature.

$X^1$ is hydrogen or fluorine. $X^5$ is hydrogen or fluorine. Particularly desirable $X^5$ is hydrogen for decreasing the minimum temperature. $X^2$, $X^3$ and $X^4$ are each independently hydrogen or fluorine. In the compound (3-1), desirable $X^2$, $X^3$ and $X^4$ are fluorine, hydrogen and hydrogen, hydrogen, hydrogen and fluorine, or fluorine, fluorine and hydrogen, in this order, for decreasing the minimum temperature and decreasing the viscosity. More desirable $X^2$, $X^3$ and $X^4$ are fluorine, and hydrogen and hydrogen, in this order.

$Y^1$ is fluorine or chlorine. Desirable $Y^1$ is fluorine for decreasing the minimum temperature. $Y^2$ is fluorine or trifluoromethoxy.

Fifth, examples of the component compounds will be shown. In the desirable compounds described below, $R^2$ and $R^3$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine; $R^9$ is alkyl having approximately 1 to approximately 12 carbons or alkenyl having 2 to 12 carbons; $R^{10}$ is alkyl having approximately 1 to approximately 12 carbons or alkoxy having approximately 1 to approximately 12 carbons; and $R^{11}$ is alkyl having approximately 1 to approximately 12 carbons. In these compounds, trans is preferable to cis for the steric configuration of 1,4-cyclohexylene for increasing a maximum temperature.

The symbol $R^2$, for example, is used for many compounds in the chemical formulas for the component compounds. $R^2$ may be identical or different in these compounds. In one case, for example, $R^2$ of the compound (2-2-1) is ethyl and $R^2$ of the compound (3-1-1) is ethyl. In another case, $R^2$ of the compound (2-2-1) is ethyl and $R^2$ of the compound (3-1-1) is propyl. This rule is also applicable to the symbols $R^3$, $R^9$, $R^{10}$, $R^{11}$ and so forth.

Desirable compound (1) are the compounds (1-1) to (1-40). More desirable compound (1) are the compounds (1-1), (1-5), (1-20) and (1-24) for decreasing the minimum temperature and decreasing the viscosity. Particularly desirable is the compound (1-5).

Desirable compound (2-1) are the compounds (2-1-1) to (2-1-4). More desirable compound (2-1) are the compounds (2-1-2) and (2-1-3) for decreasing the minimum temperature.

Desirable compound (2-2) are the compounds (2-2-1) and (2-2-2). More desirable compound (2-2) is the compound (2-2-1).

Desirable compound (3-1) are the compounds (3-1-1) to (3-1-3). More desirable compound (3-1) is the compound (3-1-1) for decreasing the minimum temperature and decreasing the viscosity. Desirable compound (3-2) are the compounds (3-2-1) and (3-2-2). More desirable compound (3-2) is the compound (3-2-2) for decreasing the minimum temperature. Desirable compound (3-3) are the compounds (3-3-1) to (3-3-3). More desirable compound (3-3) are the compounds (3-3-1) and (3-3-3) for decreasing the minimum temperature.

Desirable compound (4) are the compounds (4-1) to (4-8). More desirable compound (4) are the compounds (4-2), (4-3) and (4-8) for decreasing the minimum temperature and decreasing the viscosity. Particularly desirable compound (4) are the compounds (4-2) and (4-3).

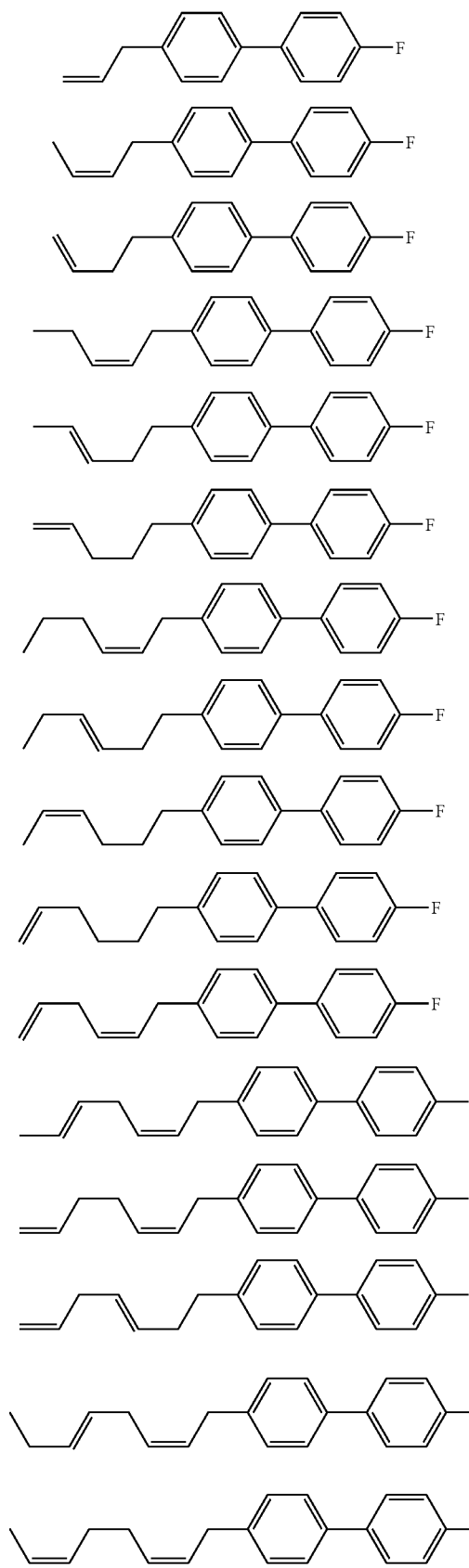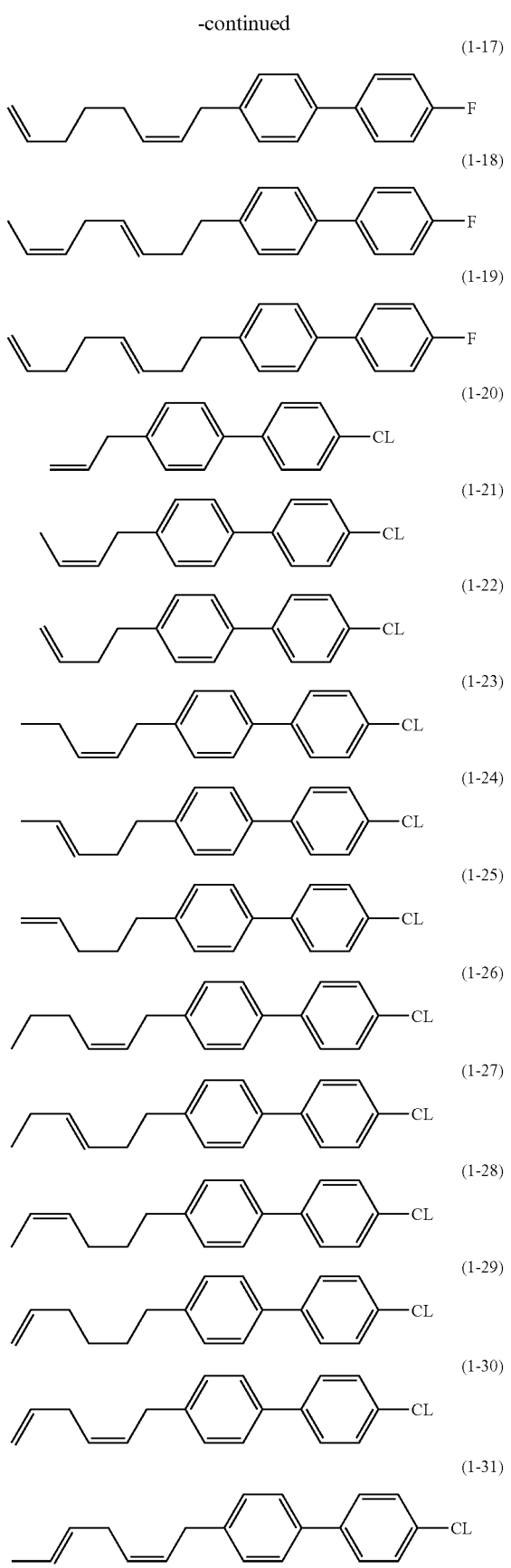

-continued (1-32) (1-33) (1-34) (1-35) (1-36) (1-37) (1-38) (1-39) (1-40) (2-1-1) (2-1-2) (2-1-3) (2-1-4) (2-2-1) (2-2-2) (3-1-1) (3-1-2) (3-1-3) (3-2-1) (3-2-2) (3-3-1) (3-3-2) (3-3-3) (4-1)

-continued

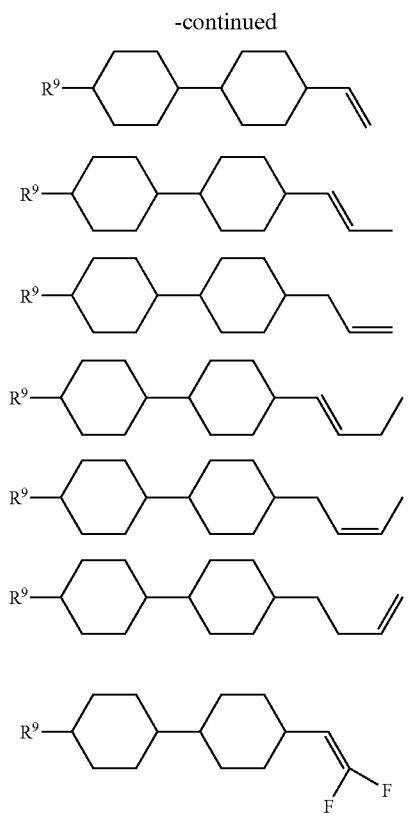

Sixth, the preparation methods of the component compounds will be explained. These compounds can be prepared by known methods. The preparation method will be exemplified below. The compounds (1-1), (1-5), (1-20) and (1-24) are prepared by the method disclosed in JP S61-27931 A/1986. The compounds (2-1-2) and (2-1-3) are prepared by the method disclosed JP H10-251186 A/1998. The compound (3-1-1) is prepared by the method disclosed in JP S60-51135 A/1985. The compound (3-3-1) is prepared by the method disclosed in JP S57-165328 A/1982. The compound (3-3-3) is prepared by the method disclosed in JP S57-114531 A/1982. The compound (4-7) is prepared by the method disclosed in JP S61-27928 A/1986. The compound (4-8) is prepared by the method disclosed in JP H1-308239 A/1989.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Seventh, additives capable of being mixed with the composition will be explained. The additive includes an optically active compound, a coloring matter, an antioxidant, an ultraviolet light absorbent and so forth. An optically active compound is mixed in the composition for inducing a helical structure of liquid crystal to provide a twist angle. Examples of the optically active compound include the compounds (5-1) to (5-4) below. A desirable ratio of the optically active compound is approximately 5% or less, and a more desirable ratio thereof ranges from approximately 0.01% to approximately 2%.

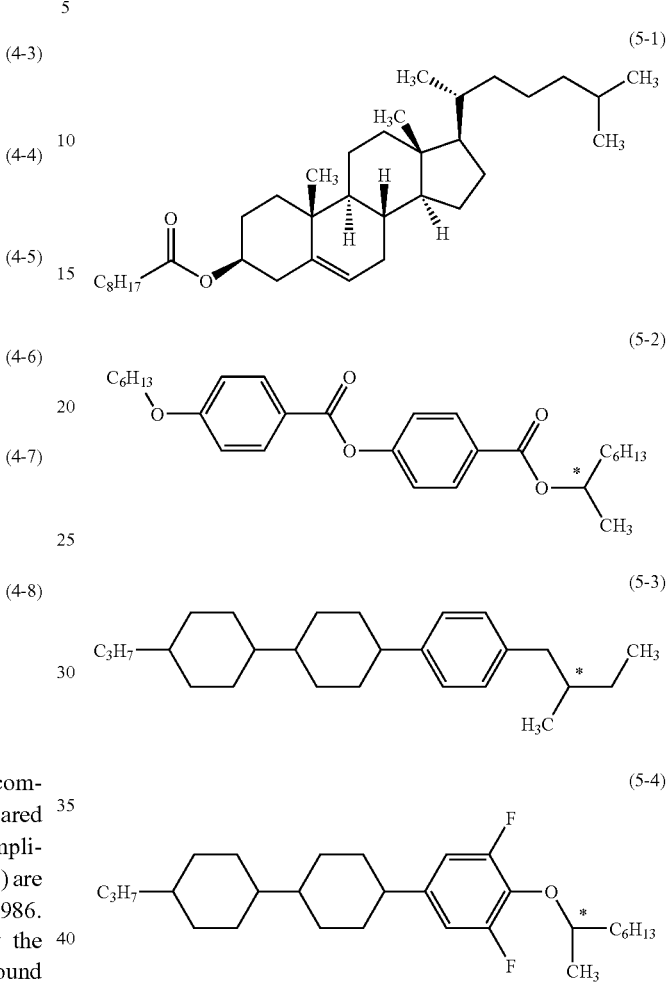

A dichroic dye, such as an azo dye and an anthraquinone dye, is mixed with the composition to suit for a device of a guest host (GH) mode. A desirable ratio of the dye ranges from approximately 0.01% to approximately 10%. An antioxidant is mixed with the composition in order to avoid a decrease in specific resistance caused by heating in the air, or to maintain a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

Preferred examples of the antioxidant include the compound (6) wherein k is an integer of from 1 to 9. In the compound (6), desirable k are 1, 3, 5, 7, or 9. More desirable k are 1 or 7. When k is 1, the compound (6) has a large volatility, and is effective in preventing the decrease of specific resistance caused by heating in the air. When k is 7, the compound (6) has a small volatility, and is effective in maintaining a large voltage holding ratio at room temperature and also at a high temperature even after the device has been used for a long time.

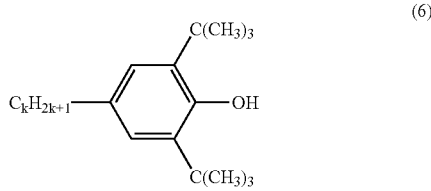

(6)

Preferred examples of the ultraviolet light absorbent include a benzophenone derivative, a benzoate derivative and a triazole derivative. A desirable ratio of the ultraviolet light absorbent is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 1,000 ppm.

Last, use of the composition will be explained. Most of the compositions have a minimum temperature of approximately −20° C. or less, a maximum temperature of approximately 70° C. or more, and an optical anisotropy of approximately 0.10 to approximately 0.17. The device containing the composition has a large voltage holding ratio. The composition is suitable for an AM device. The composition is suitable especially for an AM device of a transmission type. The composition having an optical anisotropy of approximately 0.10 to approximately 0.17, and further the composition having an optical anisotropy of approximately 0.08 to approximately 0.30, may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for an device having a mode such as PC, TN, STN, ECB, OCB, IPS, VA, and so forth. It is desirable to use the composition for a device for fast response having a mode of TN or OCB. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in detail by way of Examples. The invention is not limited by the Examples described below. The compounds described in the Comparative Examples and the Examples are expressed by the symbols according to the definition in Table 3. In Table 3, the steric configuration of 1,4-cyclohexylene and 1,3-dioxane-2, 5-diyl is trans. The steric configuration regarding a bonding group of —CH═CH— is trans. The parenthesized number next to the symbolized compounds in the Examples corresponds to the number of the desirable compound. The symbol (—) means other liquid crystal compound. A ratio (percentage) of a liquid crystal composition is percentage by weight (% by weight) based on the total weight of a liquid crystal composition. The composition is prepared by first measuring components such as a liquid crystal compound and then by mixing them. Accordingly, the weight percentages of the component compounds can be easily calculated.

TABLE 3

Method of Description of Compound using Symbols
R—(A$_1$)—Z$_1$— ... —Z$_n$—(A$_n$)—R'

| 1) Left Terminal Group R— | Symbol |
|---|---|
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$═CH— | V- |
| C$_n$H$_{2n+1}$—CH═CH— | nV- |
| CH$_2$═CH—C$_n$H$_{2n}$— | Vn- |
| C$_m$H$_{2m+1}$—CH═CH—C$_n$H$_{2n}$— | mVn- |
| CH$_2$═CH—C$_2$H$_4$—CH═CH—C$_2$H$_4$— | V2V2- |
| CF$_2$═CH— | VFF- |
| CF$_2$═CH—(CH$_2$)$_2$— | VFF2- |

| 2) Right Terminal Group —R' | Symbol |
|---|---|
| —C$_n$H$_{2n+1}$ | -n |
| —OC$_n$H$_{2n+1}$ | —On |
| —F | —F |
| —Cl | —CL |
| —OCF$_3$ | —OCF$_3$ |
| —OCF$_2$CFHCF$_3$ | —OCF$_2$CFHCF$_3$ |

| 3) Bonding group —Zn— | Symbol |
|---|---|
| —C$_2$H$_4$— | 2 |
| —COO— | E |
| —CH═CH— | V |
| —C≡C— | T |
| —CF$_2$O— | X |

| 4) Ring Structure —An— | Symbol |
|---|---|
| (cyclohexylene) | H |
| (phenylene) | B |
| (fluorophenylene) | B(F) |
| (difluorophenylene) | B(2F) |

TABLE 3-continued

Method of Description of Compound using Symbols
R—(A$_1$)—Z$_1$— . . . —Z$_n$—(A$_n$)—R'

B(F,F) — difluorobenzene ring (F at 1,3 positions)

B(2F,5F) — difluorobenzene ring (F at 2,5 positions)

G — 1,3-dioxane ring

5) Example of Description

Example 1    1V2-BB-F

Example 2    V-HH-3

Example 3    2-BBB(2F)-3

Example 4    3-BB(F,F)XB(F)—OCF$_3$

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured for the sample−0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/ 95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

$C_3H_7$—cyclohexyl—phenyl—CN    24%

$C_5H_{11}$—cyclohexyl—phenyl—CN    36%

$C_7H_{15}$—cyclohexyl—phenyl—CN    25%

$C_5H_{11}$—cyclohexyl—phenyl—phenyl—CN    15%

Measurement of the characteristics was carried out according to the following methods. Most methods are described in the Standard of Electric Industries Association of Japan, EIAJ ED-2521A or those with some modifications. A TFT was not attached to a TN device used for measurement.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; mPa·s, measured at 20° C.): A viscosity was measured by means of an E-type viscometer.

Rotation Viscosity (γ1; measured at 25° C.; mPa·s): Rotation viscosity was measured according to the method disclosed in M. Imai, et al., *Molecular Crystals and Liquid Crystals*, vol. 259, p. 37 (1995). A sample was placed in a TN device, in which a twist angle was 0°, and a cell gap between two glass plates was 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. Rotation viscosity was obtained from the measured values and the calculating equation (8) in the literature by M. Imai, et al., p. 40. As the dielectric anisotropy necessary for the calculation, the value measured by the method described below with the device for measuring the rotation viscosity was used.

Optical Anisotropy (refractive index anisotropy Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index nil was measured when the direction of a polarized light was parallel to that of the rubbing. Refractive index n⊥ was measured when the direction of a polarized light was perpendicular to that of the rubbing. A value of optical anisotropy was calculated from the equation; $\Delta n = n\| - n\perp$.

Dielectric Anisotropy ($\Delta\epsilon$; measured at 25° C.): A sample was put in a TN device having a distance between two glass substrates (cell gap) of 9 μm and a twist angle of 80°. Sine waves (10 V, 1 kHz) were impressed onto the device, and a dielectric constant ($\epsilon\|$) in a major axis direction of a liquid crystal molecule was measured after 2 seconds. Sine waves (0.5 V, 1 kHz) were impressed onto the device, and a dielectric constant ($\epsilon\perp$) in a minor axis direction of a liquid crystal molecule was measured after 2 seconds. A value of a dielectric anisotropy was calculated from the equation: $\Delta\epsilon = \epsilon\| - \epsilon\perp$.

Threshold Voltage (Vth; measured at 25° C.; V): Measurement was carried out with LCD Evaluation System Model LCD-5100 made by Otsuka Electronics Co., Ltd. Light source is a halogen lamp. A sample was poured into a TN device of a normally white mode, in which a cell gap between two glass plates was about 0.45/$\Delta$n (μm), and a twist angle was 80°. Voltage to be impressed onto the device (32 Hz, rectangular waves) was stepwise increased by 0.02 volt starting from 0 V up to 10 V During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 90% transmittance.

Voltage Holding Ratio (VHR-1; measured at 25° C.; %, VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-3; measured at 25° C.; %): A voltage holding ratio was measured after irradiating with ultraviolet light to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 1667 milliseconds.

Response Time ($\tau$; measured at 25° C.; millisecond): Measurement was carried out with LCD Evaluation System Model LCD-5100 made by Otsuka Electronics Co., Ltd. Light source is a halogen lamp. Low-pass filter was set at 5 kHz. A sample was poured into a TN device of a normally white mode, in which a cell gap between two glass plates was approximately 0.45/$\Delta$n (μm), and a twist angle was 80°. Rectangle waves (60 Hz, 5 V, 0.5 seconds) was impressed to the device. During impressing, the device was irradiated with light in a perpendicular direction, and an amount of the light passing through the device was measured. A maximum amount of a light corresponds to 100% transmittance, and a minimum amount of a light corresponds to 0% transmission. Rise time ($\tau$r) is a period of time requited for the change in transmittance from 10% to 90%. Fall time ($\tau$f) is a period of time required for the change in transmittance from 10% to 90%. Response time is the sum of the rise time and the fall time thus obtained.

Gas Chromatographic Analysis: A gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared into an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimadzu Corporation may be used. An area ratio of each peak in the gas chromatogram corresponds to a ratio of the component compound. In general, percentage by weight of the component compound is not completely identical to an area ratio of each peak. According to the invention, however, the correction efficient is substantially 1 when these capillary columns are used, and therefore, percentage by weight of the sample may be regarded to be identical to percentage by area ratio of each peak of the sample because there is no significant difference in correction efficient of component compounds. In order to obtain accurately the composition ratios of liquid crystal compounds in the liquid crystal composition by gas chromatogram, an internal reference method of gas chromatography is employed. The liquid crystal compounds (components to be measured) weighed in given weights accurately and a standard liquid crystal compound (reference substance) are simultaneously measured by gas chromatography, and the relative intensity of area ratio between a peak of the component to be measured and the reference substance is calculated in advance. Correction with the relative intensity of peak area of each component to the reference substance provides accurate composition ratios of liquid crystal compounds in the liquid crystal composition by gas chromatography analysis.

Comparative Example 1

Example 4 was chosen from the compositions disclosed in JP H10-114693 A/1998. The basis is that the composition contains the compound (1-3). The components and characteristics of the composition are as follows. The composition was prepared and measured for characteristics.

| | | |
|---|---|---|
| V2-BB-F | (1-3) | 20% |
| V-HHB(F)-F | (—) | 40% |
| V2-HHB(F)-F | (—) | 40% |

NI = 74.8° C.;
Tc ≦ 0° C.;
Δn = 0.098;
Δε = 3.4;
γ1 = 70.5 mPa · s;
VHR-1 = 99.1%;
VHR-2 = 98.2%.

Example 1

| | | |
|---|---|---|
| 1V2-BB-F | (1-5) | 8% |
| 3-BB(F,F)XB(F,F)-F | (2-1-2) | 19% |
| 2-BB(F)B-3 | (3-1-1) | 10% |
| 2-BB(F)B-5 | (3-1-1) | 14% |
| 3-BB(F)B-5 | (3-1-1) | 16% |
| V-HH-3 | (4-2) | 23% |
| 1V-HH-3 | (4-3) | 6% |
| 5-HBB(F)B-2 | (—) | 4% |

NI = 74.9° C.;
Tc ≦ −20° C.;
Δn = 0.159;
Δε = 3.8;
γ1 = 60.8 mPa · s;
Vth = 2.39 V;
VHR-1 = 98.9%;
VHR-2 = 98.0%;
τ = 25.7 msec.

The composition of Example 1 had an equivalent maximum temperature, a low minimum temperature, a large dielectric anisotropy, a large optical anisotropy and a small rotation viscosity, as compared to the composition of Comparative Example 1.

Example 2

| | | |
|---|---|---|
| 1V2-BB-F | (1-5) | 13% |
| 3-BB(F,F)XB(F,F)-F | (2-1-2) | 24% |
| 2-BB(F)B-3 | (3-1-1) | 3% |
| 2-HBB-F | (3-2-2) | 7% |
| 3-HBB-F | (3-2-2) | 7% |
| 5-HBB-F | (3-2-2) | 7% |
| 3-HHB-1 | (3-3-1) | 8% |
| 3-HHB-CL | (3-3-3) | 8% |
| 5-HHB-CL | (3-3-3) | 7% |
| V-HH-3 | (4-2) | 12% |
| V-HH-5 | (4-2) | 4% |

NI = 73.4° C.;
Tc ≦ −20° C.;
Δn = 0.124;
Δε = 6.3;
γ1 = 66.4 mPa · s;
Vth = 1.71 V;
VHR-1 = 99.0%;
VHR-2 = 98.0%;
τ = 21.8 msec.

Example 3

| | | |
|---|---|---|
| 1V2-BB-CL | (1-24) | 8% |
| 3-BB(F,F)XB(F,F)-F | (2-1-2) | 20% |
| 2-BB(F)B-3 | (3-1-1) | 8% |
| 2-BB(F)B-5 | (3-1-1) | 14% |
| 3-BB(F)B-5 | (3-1-1) | 16% |
| V-HH-3 | (4-2) | 31% |
| 5-HBB(F)B-2 | (—) | 3% |

NI = 72.2° C.;
Tc ≦ −20° C.;
Δn = 0.157;
Δε = 4.0;
γ1 = 56.9 mPa · s;
Vth = 2.25 V;
VHR-1 = 98.7%;
VHR-2 = 98.1%;
τ = 22.8 msec.

Example 4

| | | |
|---|---|---|
| V2-BB-CL | (1-22) | 13% |
| 3-BB(F,F)XB(F,F)-F | (2-1-2) | 22% |
| 2-BB(F)B-3 | (3-1-1) | 2% |
| 2-HBB-F | (3-2-2) | 7% |
| 3-HBB-F | (3-2-2) | 7% |
| 5-HBB-F | (3-2-2) | 7% |
| 3-HHB-1 | (3-3-1) | 8% |
| 3-HHB-CL | (3-3-3) | 8% |
| 5-HHB-CL | (3-3-3) | 7% |
| V-HH-3 | (4-2) | 12% |
| V-HH-5 | (4-2) | 7% |

NI = 75.3° C.;
Tc ≦ −10° C.;
Δn = 0.124;
Δε = 5.9;
γ1 = 62.0 mPa · s;
Vth = 1.73 V;
VHR-1 = 98.5%;
VHR-2 = 97.9%;
τ = 20.8 msec.

Example 5

| | | |
|---|---|---|
| V4-BB-F | (1-10) | 13% |
| 3-BB(F,F)XB(F,F)-F | (2-1-2) | 21% |
| 2-BB(F)B-3 | (3-1-1) | 7% |
| 2-HBB-F | (3-2-2) | 7% |
| 3-HBB-F | (3-2-2) | 7% |
| 5-HBB-F | (3-2-2) | 7% |
| 3-HHB-1 | (3-3-1) | 6% |
| 3-HHB-3 | (3-3-1) | 3% |
| 3-HHB-CL | (3-3-3) | 8% |
| 5-HHB-CL | (3-3-3) | 7% |
| V-HH-3 | (4-2) | 9% |
| V-HH-5 | (4-2) | 5% |

NI = 74.1° C.;
Tc ≦ −20° C.;
Δn = 0.124;
Δε = 5.6;
γ1 = 65.0 mPa · s;
Vth = 1.89 V;
VHR-1 = 98.2%;
VHR-2 = 97.9%;
τ = 22.2 msec.

Example 6

| | | |
|---|---|---|
| V2V2-BB-F | (1-19) | 13% |
| 3-BB(F,F)XB(F,F)-F | (2-1-2) | 21% |
| 2-BB(F)B-3 | (3-1-1) | 7% |
| 2-HBB-F | (3-2-2) | 7% |
| 3-HBB-F | (3-2-2) | 7% |
| 5-HBB-F | (3-2-2) | 7% |
| 3-HHB-1 | (3-3-1) | 8% |
| 3-HHB-CL | (3-3-3) | 8% |
| 5-HHB-CL | (3-3-3) | 7% |
| V-HH-3 | (4-2) | 12% |
| V-HH-5 | (4-2) | 3% |

NI = 74.7° C.;
Tc ≦ −20° C.;
Δn = 0.125;
Δε = 5.6;
γl = 66.7 mPa · s;
Vth = 1.77 V;
VHR-1 = 98.2%;
VHR-2 = 97.9%;
τ = 22.7 msec.

Example 7

| | | |
|---|---|---|
| V2-BB-F | (1-3) | 5% |
| 1V2-BB-F | (1-5) | 8% |
| 3-BB(F,F)XB(F,F)-F | (2-1-2) | 10% |
| 3-BB(F,F)XB(F,F)-OCF3 | (2-1-4) | 12% |
| 2-BB(F)B-3 | (3-1-1) | 10% |
| 2-BB(F)B-5 | (3-1-1) | 10% |
| V-HHB-1 | (3-3-1) | 10% |
| V2-HHB-1 | (3-3-1) | 8% |
| V-HH-3 | (4-2) | 15% |
| V-HH-4 | (4-2) | 8% |
| 5-HBB(F)B-2 | (—) | 4% |

NI = 73.8° C.;
Tc ≦ −20° C.;
Δn = 0.139;
Δε = 4.7;
γl = 59.6 mPa · s;
Vth = 2.16 V;
VHR-1 = 98.3%;
VHR-2 = 97.9%;
τ = 23.4 msec.

Example 8

| | | |
|---|---|---|
| V2-BB-F | (1-3) | 5% |
| 1V2-BB-F | (1-5) | 12% |
| 3-BB(F,F)XB(F)-OCF3 | (2-1-3) | 18% |
| 3-BB(F)B(F,F)-F | (2-2-1) | 10% |
| 2-BB(F)B-3 | (3-1-1) | 5% |
| 2-BBB(2F)-3 | (3-1-2) | 5% |
| 2-BBB(2F)-5 | (3-1-2) | 5% |
| 2-BB(2F,5F)B-2 | (3-1-3) | 5% |
| 3-HHB-1 | (3-3-1) | 3% |
| 3-HHB-O1 | (3-3-1) | 3% |
| V-HHB-1 | (3-3-1) | 5% |
| VFF-HHB-1 | (3-3-1) | 8% |
| 3-HHB-F | (3-3-2) | 5% |

-continued

| | | |
|---|---|---|
| V-HH-3 | (4-2) | 6% |
| VFF-HH-3 | (4-8) | 5% |

NI = 70.1° C.;
Tc ≦ −20° C.;
Δn = 0.152;
Δε = 5.2;
γl = 77.5 mPa · s;
Vth = 2.01 V;
VHR-1 = 98.0%;
VHR-2 = 97.5%;
τ = 27.1 msec.

Example 9

| | | |
|---|---|---|
| V2-BB-F | (1-3) | 3% |
| 1V2-BB-F | (1-5) | 7% |
| V4-BB-F | (1-10) | 3% |
| 1V2-BB-CL | (1-24) | 5% |
| VFF2-BB-F | (1-39) | 4% |
| 3-BB(F,F)XB(F,F)-F | (2-1-2) | 10% |
| 3-BB(F,F)XB(F)-F | (2-1-1) | 5% |
| 3-BB(F,F)XB(F)-OCF3 | (2-1-3) | 6% |
| 3-HBB-2 | (3-2-1) | 5% |
| V2-HBB-2 | (3-2-1) | 4% |
| 1V2-HBB-2 | (3-2-1) | 4% |
| 2-HBB-F | (3-2-2) | 5% |
| 3-HBB-F | (3-2-2) | 5% |
| 5-HBB-F | (3-2-2) | 5% |
| V-HHB-1 | (3-3-1) | 12% |
| V2-HHB-1 | (3-3-1) | 5% |
| V-HH-3 | (4-2) | 6% |
| VFF-HH-3 | (4-8) | 6% |

NI = 71.2° C.;
Tc ≦ −20° C.;
Δn = 0.136;
Δε = 4.7;
γl = 55.7 mPa · s;
Vth = 2.13 V;
VHR-1 = 98.0%;
VHR-2 = 97.7%;
τ = 20.7 msec.

Example 10

| | | |
|---|---|---|
| V2-BB-F | (1-3) | 5% |
| 1V2-BB-F | (1-5) | 10% |
| 3-BB(F,F)XB(F,F)-F | (2-1-2) | 10% |
| 3-BB(F)B(F,F)-F | (2-2-1) | 12% |
| 3-HBB-2 | (3-2-1) | 5% |
| 5-HBB-2 | (3-2-1) | 3% |
| V2-HBB-2 | (3-2-1) | 5% |
| 2-HBB-F | (3-2-2) | 7% |
| 3-HBB-F | (3-2-2) | 7% |
| 5-HBB-F | (3-2-2) | 7% |
| V-HH-3 | (4-2) | 10% |
| V-HH-4 | (4-2) | 5% |
| V-HH-5 | (4-2) | 5% |
| 1V-HH-3 | (4-3) | 5% |
| 5-HBB(F)B-2 | (—) | 4% |

NI = 72.7° C.;
Tc ≦ −20° C.;
Δn = 0.135;
Δε = 4.0;
γl = 52.4 mPa · s;
Vth = 2.32 V;
VHR-1 = 98.3%;
VHR-2 = 97.9%;
τ = 21.1 msec.

Example 11

| | | |
|---|---|---|
| 1V2-BB-F | (1-5) | 10% |
| 1V2-BB-CL | (1-24) | 7% |
| 3-BB(F,F)XB(F,F)-F | (2-1-2) | 10% |
| 3-BB(F,F)XB(F,F)-OCF3 | (2-1-4) | 5% |
| 3-BB(F,F)XB(F)-OCF3 | (2-1-3) | 10% |
| 3-HHB-1 | (3-3-1) | 5% |
| 3-HHB-3 | (3-3-1) | 5% |
| 3-HHB-O1 | (3-3-1) | 5% |
| V-HHB-1 | (3-3-1) | 7% |
| V2-HHB-1 | (3-3-1) | 5% |
| VFF-HHB-1 | (3-3-1) | 5% |
| 3-HHB-CL | (3-3-3) | 5% |
| 5-HHB-CL | (3-3-3) | 5% |
| V-HH-3 | (4-2) | 16% |

NI = 82.1° C.;
Tc ≦ −20° C.;
Δn = 0.125;
Δε = 5.1;
γl = 65.9 mPa · s;
Vth = 2.12 V;
VHR-1 = 98.2%;
VHR-2 = 97.7%;
τ = 23.7 msec.

Example 12

| | | |
|---|---|---|
| 1V2-BB-F | (1-5) | 4% |
| V4-BB-F | (1-10) | 4% |
| V2V2-BB-F | (1-19) | 3% |
| 3-BB(F,F)XB(F,F)-F | (2-1-2) | 4% |
| 3-BB(F,F)XB(F,F)-OCF3 | (2-1-4) | 7% |
| 3-BB(F)B(F,F)-F | (2-2-1) | 6% |
| 5-BB(F)B(F,F)-F | (2-2-1) | 6% |
| 2-BB(F)B-3 | (3-1-1) | 5% |
| 2-BB(F)B-5 | (3-1-1) | 5% |
| 2-BBB(2F)-3 | (3-1-2) | 5% |
| 2-BB(2F,5F)B-2 | (3-1-3) | 4% |
| 3-BB(2F,5F)B-3 | (3-1-3) | 4% |
| 1V2-HBB-2 | (3-2-1) | 10% |
| 3-HBB-2 | (3-2-1) | 5% |
| 2-HBB-F | (3-2-2) | 4% |
| 3-HBB-F | (3-2-2) | 4% |
| 5-HBB-F | (3-2-2) | 4% |
| V-HH-3 | (4-2) | 16% |

NI = 74.8° C.;
Tc ≦ −20° C.;
Δn = 0.162;
Δε = 4.7;
γl = 93.7 mPa · s;
Vth = 2.16 V;
VHR-1 = 98.3%;
VHR-2 = 97.8%;
τ = 35.0 msec.

Example 13

| | | |
|---|---|---|
| 1V2-BB-F | (1-5) | 7% |
| 3-BB(F,F)XB(F,F)-F | (2-1-2) | 10% |
| 3-BB(F,F)XB(F,F)-OCF3 | (2-1-4) | 10% |
| 2-BB(F)B-3 | (3-1-1) | 5% |
| 1V2-BB(F)B-2 | (3-1-1) | 5% |
| 1V2-HBB-2 | (3-2-1) | 10% |
| V-HHB-1 | (3-3-1) | 10% |
| V-HH-3 | (4-2) | 10% |
| 1V-HH-3 | (4-3) | 10% |
| 7-HB-1 | (—) | 5% |
| 3-HB-CL | (—) | 10% |
| 5-HBB(F)B-2 | (—) | 4% |
| 5-HBB(F)B-3 | (—) | 4% |

NI = 77.8° C.;
Tc ≦ −20° C.;
Δn = 0.137;
Δε = 4.2;
γl = 68.1 mPa · s;
Vth = 2.30 V;
VHR-1 = 98.2%;
VHR-2 = 97.9%;
τ = 26.8 msec.

Example 14

| | | |
|---|---|---|
| 1V2-BB-F | (1-5) | 5% |
| 1V2-BB-CL | (1-24) | 4% |
| V2V2-BB-CL | (1-38) | 4% |
| 3-BB(F,F)XB(F,F)-F | (2-1-2) | 20% |
| 2-HBB-F | (3-2-2) | 6% |
| 3-HBB-F | (3-2-2) | 5% |
| 5-HBB-F | (3-2-2) | 5% |
| 3-HHB-CL | (3-3-3) | 5% |
| 5-HHB-CL | (3-3-3) | 5% |
| V-HH-3 | (4-2) | 20% |
| 3-HHB(F)-F | (—) | 3% |
| 3-HBB(F)-F | (—) | 3% |
| 3-H2BB(F)-F | (—) | 3% |
| 3-HHB(F,F)-F | (—) | 3% |
| 5-HB(F)BH-3 | (—) | 3% |
| 1O1-HBBH-3 | (—) | 3% |
| 1O1-HBBH-4 | (—) | 3% |

NI = 81.5° C.;
Tc ≦ −20° C.;
Δn = 0.129;
Δε = 5.1;
γl = 83.6 mPa · s;
Vth = 2.12 V;
VHR-1 = 98.1%;
VHR-2 = 97.9%;
τ = 30.0 msec.

Example 15

| | | |
|---|---|---|
| V2-BB-F | (1-3) | 6% |
| 1V2-BB-F | (1-5) | 6% |
| 3-BB(F,F)XB(F,F)-F | (2-1-2) | 14% |
| 3-BB(F,F)XB(F,F)-OCF3 | (2-1-4) | 10% |
| V-HHB-1 | (3-3-1) | 16% |
| V2-HHB-1 | (3-3-1) | 10% |
| 3-HHB-CL | (3-3-3) | 7% |
| 5-HHB-CL | (3-3-3) | 2% |
| V-HH-3 | (4-2) | 23% |
| V-HH-5 | (4-2) | 6% |

NI = 72.4° C.;
Tc ≦ −20° C.;
Δn = 0.107;
Δε = 4.4;
γl = 44.3 mPa · s;
Vth = 2.21 V;
VHR-1 = 98.3%;
VHR-2 = 97.9%;
τ = 17.0 msec.

Example 16

| | | |
|---|---|---|
| V2-BB-F | (1-3) | 11% |
| 1V2-BB-F | (1-5) | 10% |
| 3-BB(F,F)XB(F)-OCF3 | (2-1-3) | 10% |
| 3-BB(F)B(F,F)-F | (2-2-1) | 10% |
| 2-BB(F)B-3 | (3-1-1) | 4% |
| 3-HBB-2 | (3-2-1) | 4% |
| 1V2-HBB-2 | (3-2-1) | 5% |
| 2-HBB-F | (3-2-2) | 7% |
| 3-HBB-F | (3-2-2) | 7% |
| 5-HBB-F | (3-2-2) | 7% |
| V-HHB-1 | (3-3-1) | 10% |
| VFF-HHB-1 | (3-3-1) | 5% |
| 3-HHB-CL | (3-3-3) | 5% |
| 5-HHB-CL | (3-3-3) | 5% |

NI = 84.6° C.;
Tc ≦ −20° C.;
Δn = 0.154;
Δε = 4.4;
γl = 87.6 mPa · s;
Vth = 2.32 V;
VHR-1 = 98.2%;
VHR-2 = 97.5%;
τ = 34.0 msec.

Example 17

| | | |
|---|---|---|
| V2-BB-CL | (1-22) | 5% |
| 1V2-BB-CL | (1-24) | 2% |
| VFF2-BB-CL | (1-40) | 3% |
| 3-BB(F,F)XB(F,F)-F | (2-1-2) | 10% |
| 3-BB(F,F)XB(F)-OCF3 | (2-1-3) | 10% |
| 2-BB(2F,5F)B-2 | (3-1-3) | 5% |
| 3-BB(2F,5F)B-3 | (3-1-3) | 5% |
| V2-HBB-2 | (3-2-1) | 10% |
| 3-HHB-1 | (3-3-1) | 5% |
| 3-HHB-3 | (3-3-1) | 5% |
| V-HHB-1 | (3-3-1) | 10% |
| 3-HHB-CL | (3-3-3) | 6% |
| 5-HHB-CL | (3-3-3) | 6% |
| 3-HB-CL | (—) | 8% |
| 3-HB-O2 | (—) | 10% |

NI = 81.5° C.;
Tc ≦ −10° C.;
Δn = 0.145;
Δε = 4.5;
γl = 86.4 mPa · s;
Vth = 2.27 V;
VHR-1 = 98.4%;
VHR-2 = 97.6%;
τ = 33.2 msec.

Example 18

| | | |
|---|---|---|
| 1V2-BB-F | (1-5) | 12% |
| 3-BB(F,F)XB(F,F)-F | (2-1-2) | 15% |
| 2-BB(F)B-3 | (3-1-1) | 10% |
| 2-HBB-F | (3-2-2) | 6% |
| 3-HBB-F | (3-2-2) | 6% |
| 5-HBB-F | (3-2-2) | 6% |
| 2-HH-3 | (4-1) | 5% |
| 3-HH-4 | (4-1) | 16% |
| 3-HHXB(F,F)-F | (—) | 10% |
| 3-HHB(F)-F | (—) | 14% |

NI = 70.6° C.;
Tc ≦ −20° C.;
Δn = 0.121;
Δε = 5.2;
γl = 68.1 mPa · s;
Vth = 2.02 V;
VHR-1 = 98.2%;
VHR-2 = 97.6%;
τ = 24.2 msec.

Example 19

| | | |
|---|---|---|
| V2-BB-F | (1-3) | 3% |
| 1V2-BB-F | (1-5) | 8% |
| 3-BB(F,F)XB(F,F)-F | (2-1-2) | 2% |
| 3-BB(F)B(F,F)-F | (2-2-1) | 18% |
| 2-BB(F)B-3 | (3-1-1) | 10% |
| V2-HBB-2 | (3-2-1) | 5% |
| 2-HBB-F | (3-2-2) | 5% |
| 3-HBB-F | (3-2-2) | 5% |
| 5-HBB-F | (3-2-2) | 5% |
| V-HH-3 | (4-2) | 10% |
| V-HH-5 | (4-2) | 10% |
| 3-HH-O1 | (—) | 10% |
| 3-HHEB(F,F)-F | (—) | 5% |
| 5-HBB(F)B-2 | (—) | 4% |

NI = 71.6° C.;
Tc ≦ −20° C.;
Δn = 0.139;
Δε = 3.8;
γl = 91.1 mPa · s;
Vth = 2.51 V;
VHR-1 = 98.4%;
VHR-2 = 97.7%;
τ = 29.9 msec.

Example 20

| | | |
|---|---|---|
| 1V2-BB-F | (1-5) | 8% |
| 1V2-BB-CL | (1-24) | 5% |
| 3-BB(F,F)XB(F,F)-F | (2-1-2) | 10% |
| 3-BB(F,F)XB(F,F)-OCF3 | (2-1-4) | 10% |
| 2-BB(F)B-3 | (3-1-1) | 10% |
| 3-HBB-2 | (3-2-1) | 3% |
| 2-HBB-F | (3-2-2) | 4% |
| 3-HBB-F | (3-2-2) | 4% |
| 5-HBB-F | (3-2-2) | 3% |
| V-HHB-1 | (3-3-1) | 10% |
| V2-HHB-1 | (3-3-1) | 5% |
| 3-HHB-CL | (3-3-3) | 3% |
| VFF-HH-3 | (4-8) | 12% |
| VFF-HH-5 | (4-8) | 5% |
| 3-HGB(F,F)-F | (—) | 4% |
| 3-GHB(F,F)-F | (—) | 4% |

NI = 73.0° C.;
Tc ≦ −20° C.;
Δn = 0.136;
Δε = 6.6;
γl = 83.6 mPa · s;
Vth = 1.81 V;
VHR-1 = 98.0%;
VHR-2 = 97.8%;
τ = 26.9 msec.

Example 21

| | | |
|---|---|---|
| V2-BB-F | (1-3) | 3% |
| 1V2-BB-F | (1-5) | 12% |
| 3-BB(F,F)XB(F,F)-F | (2-1-2) | 15% |
| 3-B(F)B(F)B(F,F)-F | (2-2-2) | 10% |
| 2-BB(F)B-3 | (3-1-1) | 4% |
| 2-BB(F)B-5 | (3-1-1) | 4% |
| 1V2-HBB-2 | (3-2-1) | 5% |
| 2-HBB-F | (3-2-2) | 4% |
| 3-HBB-F | (3-2-2) | 4% |
| 5-HBB-F | (3-2-2) | 4% |
| V-HHB-1 | (3-3-1) | 5% |
| V-HH-3 | (4-2) | 22% |
| 5-HBB(F)B-2 | (—) | 5% |
| 5-HBB(F)B-3 | (—) | 3% |

NI = 70.6° C.;
Tc ≦ −20° C.;
Δn = 0.147;
Δε = 5.6;
γ1 = 67.0 mPa·s;
Vth = 1.93 V;
VHR-1 = 98.0%;
VHR-2 = 97.8%;
τ = 22.0 msec.

Example 22

| | | |
|---|---|---|
| 1V2-BB-F | (1-5) | 12% |
| 3-BB(F)B(F,F)-F | (2-2-1) | 10% |
| 3-B(F)B(F)B(F,F)-F | (2-2-2) | 10% |
| 2-BB(F)B-3 | (3-1-1) | 4% |
| 2-BB(F)B-5 | (3-1-1) | 4% |
| 2-HBB-F | (3-2-2) | 5% |
| 3-HBB-F | (3-2-2) | 5% |
| 5-HBB-F | (3-2-2) | 5% |
| 3-HHB-F | (3-3-2) | 4% |
| 3-HHB-CL | (3-3-3) | 5% |
| 5-HHB-CL | (3-3-3) | 5% |
| V-HH-3 | (4-2) | 20% |
| V-HH-5 | (4-2) | 11% |

NI = 72.9° C.;
Tc ≦ −20° C.;
Δn = 0.136;
Δε = 3.9;
γ1 = 44.8 mPa·s;
Vth = 2.20 V;
VHR-1 = 98.0%;
VHR-2 = 97.8%;
τ = 19.2 msec.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a nematic phase comprising three components, wherein the first component is at least one compound selected from the group of compounds represented by Formula (1); the second component is at least one compound selected from the group of compounds represented by Formulas (2-1) and (2-2); and the third component is at least one compound selected from the group of compounds represented by Formulas (3-1), (3-2) and (3-3):

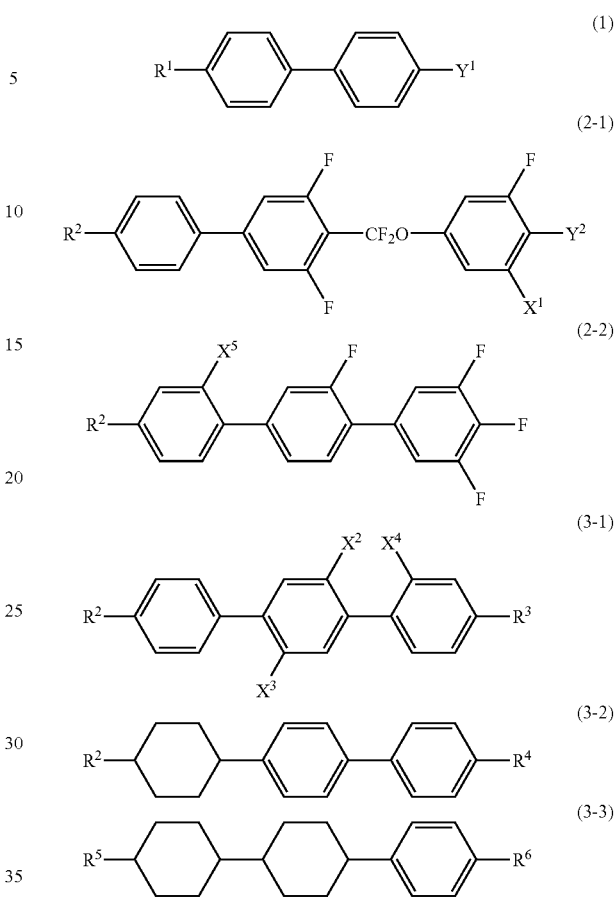

wherein $R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine; $R^2$, $R^3$ and $R^5$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine; $R^4$ is fluorine, alkyl having approximately 1 to approximately 12 carbons, or alkenyl having approximately 2 to approximately 12 carbons; $R^6$ is fluorine, chlorine, alkyl having approximately 1 to approximately 12 carbons, alkoxy having approximately 1 to approximately 12 carbons, or alkenyl having approximately 2 to approximately 12 carbons; $Y^1$ is fluorine or chlorine; $Y^2$ is fluorine or trifluoromethoxy; $X^1$ and $X^5$ are each independently hydrogen or fluorine; and $X^2$, $X^3$ and $X^4$ are each independently hydrogen or fluorine, provided that at least one of $X^2$, $X^3$ and $X^4$ is fluorine.

2. The liquid crystal composition according to claim 1, wherein the second component is at least one compound selected from the group of compounds represented by Formula (2-1), and the third component is at least one compound selected from the group of compounds represented by Formula (3-1).

3. The liquid crystal composition according to claim 1, wherein a ratio of the first component is in a range of from approximately 5% to approximately 20% by weight, a ratio of the second component is in a range of from approximately 10% to approximately 35% by weight, and a ratio of the third component is in a range of from approximately 10% to approximately 55% by weight, based on the total weight of the liquid crystal composition.

4. The liquid crystal composition according to claim 2, wherein a ratio of the first component is in a range of from approximately 5% to approximately 20% by weight, a ratio of the second component is in a range of from approximately 10% to approximately 35% by weight, and a ratio of the third component is in a range of from approximately 10% to approximately 55% by weight, based on the total weight of the liquid crystal composition.

5. A liquid crystal composition having a nematic phase and comprising four components, wherein the first component is at least one compound selected from the group of compounds represented by Formula (1), the second component is at least one compound selected from the group of compounds represented by Formulas (2-1) and (2-2), the third component is at least one compound selected from the group of compounds represented by Formulas (3-1), (3-2) and (3-3), and the fourth component is at least one compound selected from the group of compounds represented by formula (4):

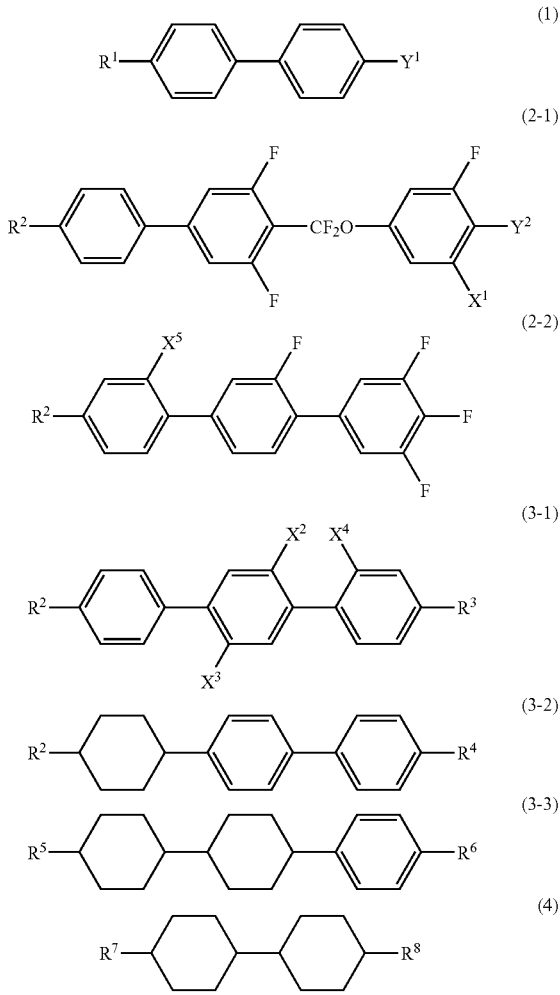

wherein $R^1$ is alkenyl having approximately 2 to approximately 12 carbons, alkadienyl having approximately 4 to approximately 12 carbons, or alkenyl having approximately 2 to approximately 12 carbons, arbitrary hydrogen of which is replaced by fluorine; $R^2$, $R^3$ and $R^5$ are each independently alkyl having approximately 1 to approximately 12 carbons, alkenyl having approximately 2 to approximately 12 carbons, or alkenyl having approximately 2 to approximately 12 carbons, arbitrary hydrogen of which is replaced by fluorine; $R^4$ is fluorine, alkyl having approximately 1 to approximately 12 carbons, or alkenyl having approximately 2 to approximately 12 carbons; $R^6$ is fluorine, chlorine, alkyl having approximately 1 to approximately 12 carbons, alkoxy having approximately 1 to approximately 12 carbons, or alkenyl having approximately 2 to approximately 12 carbons; $R^7$ and $R^8$ are each independently alkyl having approximately 1 to approximately 12 carbons, alkenyl having approximately 2 to approximately 12 carbons, or alkenyl having approximately 1 to approximately 12 carbons, arbitrary hydrogen of which is replaced by fluorine; $Y^1$ is fluorine or chlorine; $Y^2$ is fluorine or trifluoromethoxy; $X^1$ and $X^5$ are each independently hydrogen or fluorine; and $X^2$, $X^3$ and $X^4$ are each independently hydrogen or fluorine, provided that at least one of $X^2$, $X^3$ and $X^4$ is fluorine.

6. The liquid crystal composition according to claim 5, wherein the second component is at least one compound selected from the group of compounds represented by Formula (2-1).

7. The liquid crystal composition according to claim 5, wherein the fourth component is at least one compound selected from the group of compounds represented by Formula (4), wherein $R^7$ is alkenyl having approximately 2 to approximately 12 carbons, and $R^8$ is alkyl having approximately 1 to approximately 12 carbons.

8. The liquid crystal composition according to claim 6, wherein the fourth component is at least one compound selected from the group of compounds represented by Formula (4), wherein $R^7$ is alkenyl having approximately 2 to approximately 12 carbons, and $R^8$ is alkyl having approximately 1 to approximately 12 carbons.

9. The liquid crystal composition according to claim 7, wherein the third component is at least one compound selected from the group of compounds represented by Formula (3-1), wherein $X^2$ is fluorine, and $X^3$ and $X^4$ are hydrogen.

10. The liquid crystal composition according to claim 8, wherein the third component is at least one compound selected from the group of compounds represented by Formula (3-1), wherein $X^2$ is fluorine, and $X^3$ and $X^4$ are hydrogen.

11. The liquid crystal composition according to claim 1, wherein in Formula (1), $Y^1$ is fluorine.

12. The liquid crystal composition according to claim 5, wherein a ratio of the first component is in a range of from approximately 5% to approximately 20% by weight, a ratio of the second component is in a range of from approximately 10% to approximately 35% by weight, a ratio of the third component is in a range of from approximately 10% to approximately 55% by weight, and a ratio of the fourth component is in a range of from approximately 10% to approximately 40% by weight, based on the total weight of the liquid crystal composition.

13. The liquid crystal composition according to claim 1, wherein the composition has a maximum temperature of a nematic phase of approximately 70° C. or more, an optical anisotropy in a range of from approximately 0.11 to approximately 0.17 at 25° C. and a wavelength of 589 nm, and a rotation viscosity in a range of from approximately 30 mPa·s to approximately 100 mPa·s at 25° C.

14. A liquid crystal display device comprising the liquid crystal composition according to claim 1.

* * * * *